United States Patent [19]

Shimodaira et al.

[11] 3,737,805

[45] June 5, 1973

[54] CRYSTAL OSCILLATOR WITH STEPPED VARIABLE CAPACITOR

[75] Inventors: Tadayoshi Shimodaira, Shiga, Okito Naito, Suwa, both of Japan

[73] Assignee: Kabushiki Kaisha Suwa Seikosha, Tokyo, Japan

[22] Filed: Sept. 20, 1971

[21] Appl. No.: 182,251

Related U.S. Application Data

[63] Continuation of Ser. No. 862,819, Oct. 1, 1969, abandoned.

[30] Foreign Application Priority Data

Oct. 2, 1968 Japan ..............................43/71343

[52] U.S. Cl. ...........331/116 R, 317/247, 317/249 R, 317/249 D, 317/258, 317/261, 331/176, 331/179

[51] Int. Cl. ............................H01g 5/24, H03b 5/36

[58] Field of Search ..................331/116 R, 158–164, 331/179, 176; 317/249 R, 249 D, 258, 247, 261

[56] References Cited

UNITED STATES PATENTS

| | | | |
|---|---|---|---|
| 3,525,055 | 8/1970 | Mrozek | 331/116 |
| 2,420,692 | 5/1947 | Wainer | 317/258 X |
| 2,968,752 | 1/1961 | Rubinstein et al. | 317/261 X |
| 3,270,296 | 8/1966 | Aizawa et al. | 331/158 X |

FOREIGN PATENTS OR APPLICATIONS

| | | | |
|---|---|---|---|
| 117,844 | 12/1943 | Australia | 331/163 |

*Primary Examiner*—Roy Lake
*Assistant Examiner*—Siegfried H. Grimm
*Attorney*—Alex Friedman, Harold I. Kaplan and James K. Silberman

[57] ABSTRACT

A miniature variable condenser for and coupled to a quartz crystal vibrator including sandwich type evaporated capacitor sections of a plurality of capacitance, means being provided for selectively varying the total capacitance in a step by step manner by selecting combinations of said capacitor sections.

9 Claims, 7 Drawing Figures

CRYSTAL OSCILLATOR WITH STEPPED VARIABLE CAPACITOR

CROSS REFERENCE TO RELATED APPLICATION

This is a continuation application of our application Ser. No. 862,819, filed Oct. 1, 1969 and now abandoned.

BACKGROUND OF THE INVENTION

This invention relates to miniature variable condensers particularly adapted for use in conjunction with crystal oscillators in wrist watches. For such application, it is desirable to provide means for readily adjusting the frequency of the oscillator without requiring excessive manipulation of the components of the watch. Further, for incorporation in wrist watches, such structures must be both compact and strong.

SUMMARY OF THE INVENTION

Generally speaking, in accordance with the invention a stepped variable capacitor is provided having a substrate, a plurality of capacitor elements deposited on said substrate, each of said capacitor elements consisting of a common electrode, a dielectric and an output electrode; a contact member formed with a plurality of contact fingers, each of said contact fingers being positioned for registration with one of said output electrodes of said capacitor elements for displacement into and out of engagement with said output electrode; and means for selectively positioning each of said contact fingers in or out of engagement with its respective output electrode, whereby the capacitance of said stepped variable capacitor may be varied step by step by selecting combinations of said capacitor elements by selective operation of said means for positioning said contact fingers.

Said contact member is preferably formed as a comb-shaped element.

Said stepped variable capacitor may be coupled to a crystal oscillator for adjusting the frequency thereof. Said stepped variable capacitor may be connected in series with a thermo-compensating element which is in turn connected in series with said crystal vibrator. Said thermo-compensating element may be formed of a ferroelectric such as $BaTiO_3$. Said stepped variable capacitor may be divided into at least two sections, one section of said capacitor being connected in series with said thermo-compensating element, the other section being connected in parallel therewith.

Accordingly, it is an object of the present invention to provide a miniature variable capacitor which can be disposed in a small space, and which permits the selective adjustment of capacitance by incremental steps.

BRIEF DESCRIPTION OF THE DRAWINGS

For fuller understanding of the invention, reference is had to the following description taken in connection with the accompanying drawings, in which.

DESCRIPTION OF THE PREFERRED EMBODIMENTS

Figure 1:
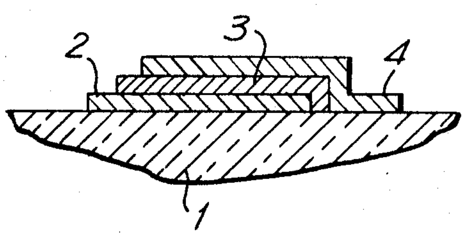
FIG. 1 is a cross sectional view showing a sandwich type evaporated capacitor in accordance with the invention.

Referring now to FIG. 1, the sandwich-type evaporated capacitor according to the invention depicted therein consists of a substrate 1, a lower electrode 2, a dielectric 3, and an upper electrode 4. In the stepped variable capacitor according to the invention, a plurality of capacitor elements are formed by dividing the lower or output electrode 2 into segments of suitable proportional dimension. Both the dielectric 3 and the upper or common electrode 4 are common to each of the capacitor elements as more particularly shown in FIG. 4. By connecting combinations of the lower or output electrodes 2 together, various total capacitance values can be obtained.

Figure 2:
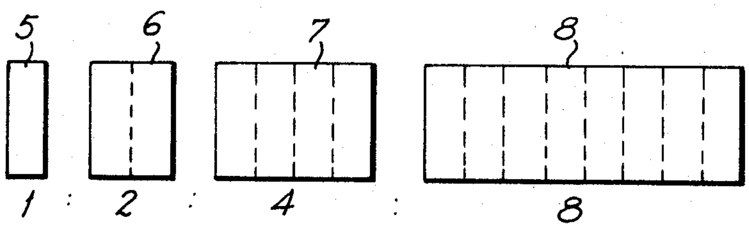
FIG. 2 is a top plan view showing a variable capacitor having a separated electrode in accordance with the invention.

FIG. 2 is a plan view showing the segmented lower electrode 2 according to the invention divided up into proportional segments of varying dimensions. The electrode segments 5, 6, 7 and 8 are dimensioned to have a respective dimensional ratio of 1 : 2 : 4 : 8. Each of the capacitors defined by electrode segments 5, 6, 7 and 8 would have respective capacitances of $C_0$, $2C_0$, $4C_0$, and $8C_0$ respectively. By appropriate combination of these four capacitor elements, 15 different capacitance values ranging from $C_0$ to $15C_0$ can be obtained including every integer multiple of $C_0$ up to 15. The capacitor elements must have the characteristics of $(1 + 2 + 4 + 8)$ to produce a stepped variable capacitor having 15 steps. By providing elements of these proportional dimensions, a capacitance up to $15\ C_0$ is realized in a minimum of space.

Applying the geometric progression;

$$\sum_{n=0}^{n} 2^n = 1+2+4+\ .\ .\ .\ +2^n = (2^{n+1}-1),$$

a capacitor divided into $(2^{n+1}-1)$ is provided when the lower or output electrode is divided into $(n+1)$ segments. Accordingly, a stepped variable capacitor may be produced of a particularly compact type of properly combining the output electrodes through the use of an appropriate contact as more particularly shown below.

Figure 3A:
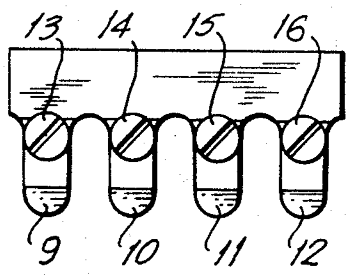
FIG. 3(a) is a top plan view of a flexible metallic plate having a plurality of contact terminals in accordance with the invention.
Figure 3B:
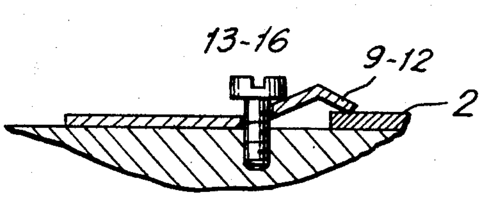
FIG. 3(b) is a cross sectional view of the structure of FIG. 3(a)
Figure 4:
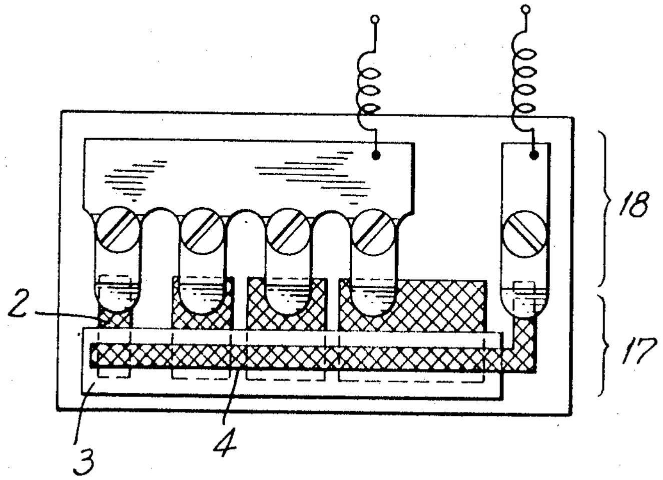
FIG. 4 is a top plan view showing one embodiment of a miniature variable capacitor in accordance with the invention.

FIGS. 3 (a) and (b) depict one such suitable contact consisting of a flexible metallic plate having a plurality of contact fingers 9, 10, 11 and 12, to form a comb-like contact member. Each of the contact fingers is resilient, and formed with an aperture therethrough for receiving one of screws 13, 14, 15 and 16. Each of the fingers is normally out of engagement with its corresponding segment of output electrode 2, but upon the tightening of its respective screw, electrical contact is made between the contact member and that segment of output electrode 2. Similarly, such electrical contact is broken by unloosening the screw. One of the output electrode segments 5, 6, 7 and 8 as depicted in FIG. 2 would be positioned opposite one of the contact fingers 9, 10, 11 and 12 as depicted in FIG. 3. The capacitor would have two output terminals, one being associated with common electrode 4, the other being associated with the contact member depicted in FIG. 3. Where output electrode fingers 5, 6, 7 and 8 are respectively associated with contact fingers 9, 10, 11 and 12, the tightening of screw 13 produces a capacitance of $C_o$ while the tightening of screws 13 and 14 produces a capacitance of $3C_o$. In like manner, capacitances ranging from $C_o$ to $15C_o$ in incremental steps can be obtained by the selective tightening of combinations of screws 13, 14, 15 and 16. One embodiment of a miniature variable condenser according to the invention is depicted in FIG. 4 wherein reference numerals 17 refers to the region of the evaporated sandwich-type capacitor, while reference numeral 18 refers to the region of the output terminals of the stepped variable condensers. The volume of space occupied by these variable capacitors can be reduced by proper selection of a high dielectric material.

Figure 5:
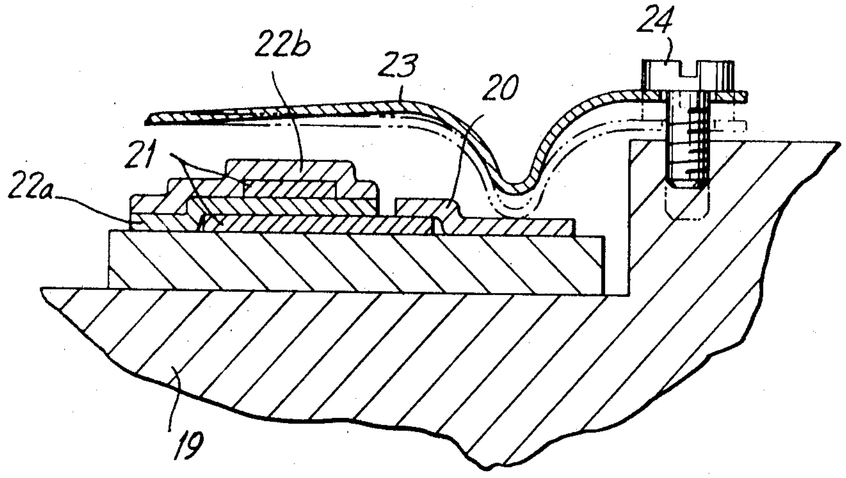
FIG. 5 is a cross sectional view of an evaporated capacitor in accordance with the invention.

A cross sectional view of the stepped variable capacitor according to the invention is depicted in FIG. 5. The substrate 19 may be formed of glass, ceramic, or the like. A portion 20 of each of the output electrode segments may consist of a separately deposited layer of chrome-aurum material. The ballance of the common and output electrodes defining the sandwich-type capacitor may be formed of deposited layers 21 of aluminum material. The dielectric 22*a* may consist of a deposited layer of $SiO_2$ while a protective thin film 22*b* may be deposited over the dielectric and common electrode, which thin film may also be formed with $SiO_2$. One contact finger 23 formed with an elastic material is depicted selectively positioned by means of adjusting screw 24.

Figure 6:
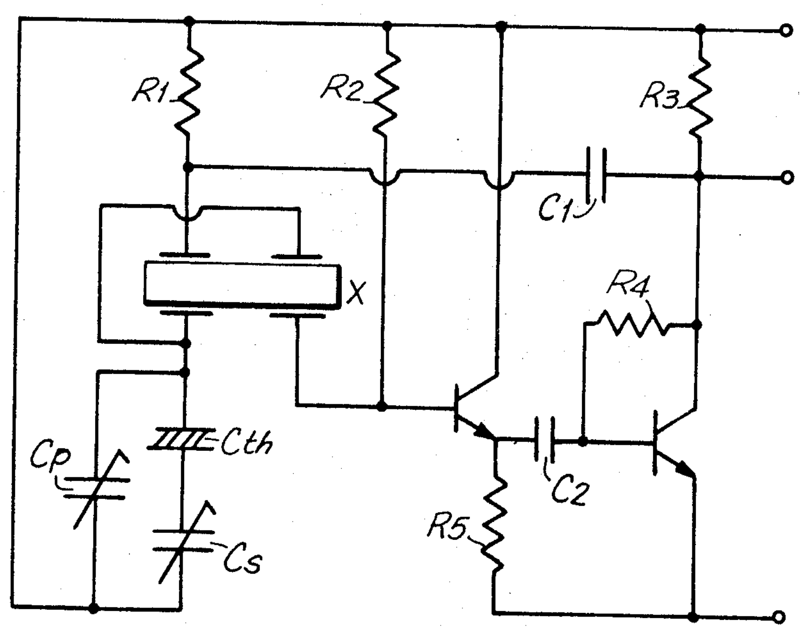
FIG. 6 is a circuit diagram of a quartz crystal oscillator in accordance with the invention.

Referring now to FIG. 6, one embodiment of a temperature compensated quartz crystal oscillating circuit is depicted. In said oscillating circuit, capacitors $C_p$ and $C_s$ are formed from stepped variable capacitors according to the invention. Capacitor $C_{th}$ is of the type wherein the capacitance changes according to changes in temperature. The circuit also includes quartz crystal vibrator X, resistors $R_1$, $R_2$, $R_3$, $R_4$ and $R_5$, feedback condenser $C_1$ and coupling condenser $C_2$. Capacitor $C_{th}$ is for temperature compensation, and incorporates a high dielectric material such as $BaTiO_3$ having its curie point at around normal temperature (approximately 20°C). As temperature increases to a point above the curie point, the temperature coefficient of the dielectric constant of capacitor $C_{th}$ reverses from the positive to the negative side. This characteristic is particularly convenient when the element is applied to a quartz crystal oscillator having a cut angle of 5°X. However, it is difficult to compensate the temperature characteristics of the quartz crystal oscillator only by means of the temperature characteristics of the high dielectric material. Accordingly, $C_s$ and $C_p$ are provided in order to adjust the compensation rate and to regulate the frequency of the quartz crystal oscillator. As the capacitance of capacitor $C_p$ increases, the ratio of capacitance change of $C_{th}$ to the total capacitance change of $C_p$ and $C_{th}$ decreases, and as a result, the amount of compensation decreases.

Generally, since the ratio of capacitance change of the high dielectric material is too large, the capacitance of capacitor $C_p$ is increased to regulate the frequency characteristics of the quartz crystal oscillator so as to render said frequency characteristics constant at every ambient temperature. By adjusting $C_s$, regulation of the frequency of the quartz crystal oscillator is such as to render the oscillator circuit suitable for incorporation in watches. By regulating the capacitance $C_s$ in a given range, the temperature compensating curve shifts in a parallel manner.

As noted above, various stepped variable condensers can be obtained by changing the value of the unit step $C_o$. In the above-described embodiment, $n = 3$, but the value of n may be optionally selected, as desired. Variable capacitors of variety of values are available to the selection of the value of $C_o$ and the dividing ratio. It is to be understood that the dividing ratio is not limited to the geometrical progression of the embodiment depicted. Further, the stepped variable condenser according to the invention can be applied to miniature integrated circuits.

What is claimed is:

1. A stepped variable capacitor comprising a substrate; a plurality of capacitor elements deposited on said substrate, each of said capacitor elements consisting of a common electrode, an output electrode, and a dielectric sandwiched between said common and output electrodes; a contact member having a plurality of flexible contact fingers, one of said contact fingers being positioned in registration with the output electrode of each of said capacitor elements for displacement into and out of electrical engagement therewith; and means for selectively positioning each of said contact fingers either in or out of engagement with its respective output electrode, whereby the capacitance of said stepped variable capacitor may be varied step by step by selecting combinations of said capacitor elements by the selective operation of said means for positioning said contact fingers.

2. A stepped variable capacitor as recited in claim 1, wherein said means for selectively positioning each of said contact fingers includes a screw secured to each of said contact fingers and mounted for displacement for carrying said contact fingers into and out of electrical contact with their respective output electrodes 3. A stepped variable capacitor as recited in claim 1, wherein said contact fingers are formed of a resilient material normally biased to be positioned out of electrical contact with the associated output electrodes.

4. A stepped variable capacitor as recited in claim 1, wherein the common electrode and dielectric of all of said capacitor elements are formed as a unit deposited on said substrate, each of said output electrodes being spaced from the other of said output electrode.

5. A stepped variable capacitor as recited in claim 4, wherein said output electrodes are each of a different dimension, whereby each of said capacitor elements have a different capacitance.

6. A stepped variable capacitor as recited in claim 5, wherein the output electrodes are dimensioned so that the capacitance value of said capacitance elements varies in accordance with a geometric progression.

7. A stepped variable capacitor as recited in claim 1, wherein said contact member is substantially comb-shaped, said contact fingers projecting from one side thereof.

8. A quartz crystal oscillator comprising a crystal vibrator; and circuit means for sustaining the vibration of said vibrator including a thermo-compensating element formed of a ferroelectric material and first and second stepped variable capacitor means, said first stepped variable capacitor means being connected in series with said thermo-compensating element and said crystal vibrator for the regulation of the frequency of said oscillator, said second stepped variable capacitor means being connected in parallel with said first stepped variable capacitor means and said thermo-compensating element for the selective adjustment of the rate of temperature compensation by said thermo-compensating element.

9. A quartz crystal oscillator as recited in claim 8, wherein each of said first and second stepped variable capacitor means includes a substrate, a plurality of capacitor elements deposited on said substrate, each of said capacitor elements consisting of a common electrode, an output electrode and a dielectric sandwich between said common and output electrodes; a contact member having a plurality of flexible contacts fingers, one of said contact fingers being positioned in registration with the output electrode of each of said capacitor elements for displacement in to and out of electrical engagement therewith, and means for selectively positioning each of said contact fingers either in or out of engagement with its respective output electrode, so that the capacitance of each of said stepped variable capacitors may be varied step by step by selecting combinations of said capacitor elements by the selective operation of said means for positioning said contact fingers.

* * * * *